Aug. 9, 1966     O. W. SMITH     3,264,928
FASTENING DEVICE
Filed June 24, 1964
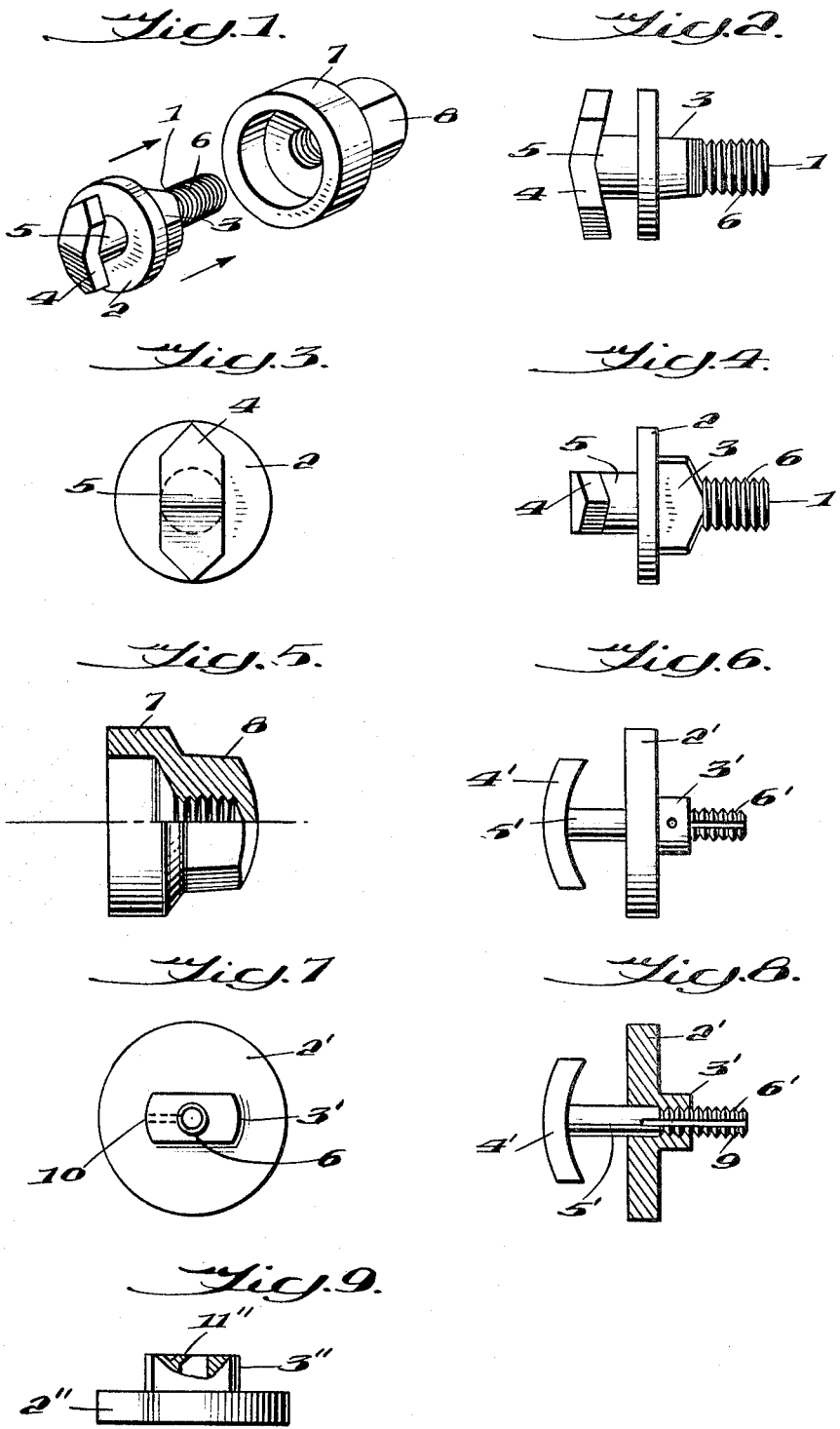

3,264,928
FASTENING DEVICE
Orville Wright Smith, Marley Creek Drive,
Glen Burnie, Md.
Filed June 24, 1964, Ser. No. 377,583
4 Claims. (Cl. 85—9)

This invention relates to a fastening device, more particularly to a fastening device to hold license plates on the body or bumper of the conventional automobile.

The place provided for the accommodation and mounting of a license plate on the conventional automobile is either on some portion of the body or on the bumper.

The portion of the body or the bumper usually has a pair of slotted holes of sufficient extent to accommodate a slight variation in license plates from State to State.

The majority of license plates also have slotted holes at the top or bottom of both to match the slotted holes in the various models of automobiles.

It is an object of this invention to provide a readily mountable fastening device for an automobile license plate.

It is another object of this invention to provide an automobile license plate fastener which can be employed to secure the license plate to the conventional automobile with one tool only.

It is a further object of this invention to provide a fastener for a license plate that will hold or clamp itself in place as the license plate is secured to the portion of the car on which it is mounted while the bolt is being applied.

Further and other objects of this invention will become apparent from the description of the accompanying drawings in which like numerals refer to like parts.

FIGURE 1 is a perspective view showing the bolt and nut of the fastening device.

FIGURE 2 is a side elevation of the bolt of the fastening device.

FIGURE 3 is an end view of the bolt shown in FIGURE 2.

FIGURE 4 is a side elevational view of the bolt of FIGURE 2, rotated 90°.

FIGURE 5 is a side elevation partly in section of the nut to be used for the fastening device.

FIGURE 6 is a side elevation of a modification of the bolt of the fastening device.

FIGURE 7 is an end view of the bolt of FIGURE 6.

FIGURE 8 is a side elevational view of the bolt of FIGURE 6 with the washer portion in section.

FIGURE 9 is an alternative washer to be used with the bolt of FIGURES 6 and 8.

When the body or the bumper of an automobile is provided with a pair of spaced slots generally registering with the spaced slots on a license plate with the conventional fastener, whether it is a conventional bolt and nut or a bolt and nut each having lock washers to install the license plate, one must have a tool on the inside of the body or bumper, which is usually quite inaccessable, as well as a tool on the outside to hold the bolt or nut from rotation while the tool on the inside runs up the bolt or nut firmly to secure the license plate in place.

As shown in FIGURE 1, a bolt generally indicated as 1 is provided having a washer portion 2 and a flattened portion 3. Head 4 is provided on a shank 5 spaced from washer portion 2. Stud 6 is threaded to engage the corresponding threads of a nut 7. Hexagonal portion 8 permits the nut to be secured by a wrench.

In FIGURE 2, the bolt or stud is shown in side elevation and of one piece construction. The stud 6 is threaded to engage the nut. Head 4 is elongated in shape and, as will be seen in FIGURE 4, is of a width about equal to the diameter of shank 5. Washer 2 is shown performing the conventional function of a washer and greater in diameter than the hole or slot in the license plate. Portion 3 formed integrally with washer 2 and stud 6, as will be seen in FIGURES 2 and 4, is broad in amount to exceed the diameter of the stud but not to exceed the slot width of the license plate. In FIGURE 2, the thickness of portion 3 is shown to be about equal to the thickness of stud 6 so that it will pass through the license plate slot.

Head 4 is formed so that its ends bend toward washer 2 and the spacing between the ends of head 4 and washer 2 can be adjusted by bending to form a fairly snug fit depending upon the thickness of the metal in the body or bumper of the car on which the license plate is to be mounted.

Head 4 is inserted in the slot on the body or bumper of a car and it will be noted that in this position, since the slots usually extend horizontally on the body or bumper of a car that projection 3 will be in a vertical position. Projection 3 affords a grip to rotate shank 5 and head 4 90° after insertion in the slot in the body or bumper of a car. When projection 3 is rotated to a horizontal position, it is then in the proper position to receive the slot of the license plate. When two bolts are used to mount a license plate, the two bolts are stabilized by the two slots in the license plate so that they will not rotate as the nut draws the license plate up tightly against washer 2.

The installation operation, therefore, is quite simple. The heads of two bolts are inserted in the two horizontal slots and by means of flattened portions 3 are turned 90° until the two flattened portions 3 are horizontal and register with the slots in the license plate. The bolt is then held against rotation while the nut draws the license plate firmly against washer 2.

In FIGURES 6, 7 and 8 a similar assembly is shown of a two part bolt and washer. The bolt has the physical characteristics of the bolt described above. Stud 6' is an extension of the shank 5' to which head 4' is secured. The washer 2' has a similar flattened portion 3' but the washer and bolt are separate parts. The portion 3' is broader than it is deep as shown in FIGURES 2 and 4. Some means is then provided for stabilizing the washer 2' against rotation on shank 5' and stud 6'. In the embodiment shown in FIGURES 6, 7 and 8, a slot 9 is milled in the shank 5' and stud 6'. A pin 10 is provided in portion 3' of washer 2' with a forced fit such that the end of the pin slides in slot 9. This maintains the orientation of 90° between elongated head 4' and elongated portion 3' on washer 2'. The function and operation are the same except that in the embodiment shown in FIGURES 6, 7 and 8 greater flexibility with respect to the mounting surface is provided in that it can accommodate a thicker metal, such as would be encountered on a truck or the like and the two part assembly drawn up quite firmly when the license plate is installed as described above with a nut 7.

FIGURE 9 shows a side elevation of a modification of washer 2" partly in section to show that the portion 3" has a portion 11" formed in the edge of the hole in the washer which extends into slot 9 to maintain the proper 90° orientation between flattened portion 3" and head 4'.

It should be obvious that any means of preventing free rotation between shank 5' and stud 6' and washer 2' may be provided such as merely milling a flat side on shank 5' and stud 6' and providing a staked portion such as 11" extending into the hole to prevent rotation on such a flattened bolt portion.

It is to be understood that certain changes, alterations, modifications and substitutions may be made within the spirit and scope of the appended claims.

What is claimed is:

1. A fastening device for motor vehicle license plates and the like, comprising a bolt member having shank and stud portions approximately equal in diameter to the width of the mounting slot in the motor vehicle, said stud portion having a threaded end portion, an elongated head member of a width generally equal to the shank diameter for it to pass through the slot in the motor vehicle and of a length substantially exceeding the shank diameter with the head having generally pointed ends and being bent generally toward the threaded stud end and in which the length is greater than the width of the slot in the motor vehicle, a washer member mounted on said shank and stud portion, said washer member having an elongated and flattened portion and including an annular portion of a diameter substantially exceeding the shank diameter with the flattened portion extending from the annular portion toward the threaded stud end, and elongated to a greater length than the width of the license plate slot and flattened to a thickness less than the width of the license plate slot, a nut with a counterbore to receive said flattened portion, and means to maintain said head member and said flattened portion of said washer member oriented approximately 90° to one another.

2. The fastening device in claim 1 in which the washer member is slidably mounted on said shank and stud portion, and means on said shank and stud portion and said washer member to maintain the approximate orientation of 90° of one to the other.

3. The fastening device in claim 1 wherein the shank and stud portions are slotted and the washer member having formed thereon means extending into said slot to maintain the approximate 90° orientation of one to the other.

4. The device as set forth in claim 3 in which the means extending into the slot is a pin.

References Cited by the Examiner

UNITED STATES PATENTS

| | | | |
|---|---|---|---|
| 1,033,758 | 7/1912 | Howell | 85—9 |
| 1,210,595 | 1/1917 | Brubaker. | |
| 1,589,063 | 6/1926 | Fondo. | |
| 3,107,390 | 10/1963 | Shelton | 151—68 |

FOREIGN PATENTS 335,054   9/1930   Great Britain.

EDWARD C. ALLEN, *Primary Examiner.*